(12) United States Patent
Kuo et al.

(10) Patent No.: US 10,211,692 B2
(45) Date of Patent: Feb. 19, 2019

(54) PERMANENT MAGNET MOTOR

(71) Applicant: HIWIN MIKROSYSTEM CORP., Taichung (TW)

(72) Inventors: Jhen Nan Kuo, Taichung (TW); Li-Wei Zheng, Taichung (TW); Ming Hung Hsieh, Taichung (TW)

(73) Assignee: HIWIN MIKROSYSTEMS CORP., Taichung (TW)

( * ) Notice: Subject to any disclaimer, the term of this patent is extended or adjusted under 35 U.S.C. 154(b) by 415 days.

(21) Appl. No.: 15/234,679

(22) Filed: Aug. 11, 2016

(65) Prior Publication Data

US 2018/0048196 A1    Feb. 15, 2018

(51) Int. Cl.
*H02K 1/27* (2006.01)
*H02K 1/02* (2006.01)

(52) U.S. Cl.
CPC .......... *H02K 1/2766* (2013.01); *H02K 1/02* (2013.01); *H02K 1/27* (2013.01); *H02K 1/2733* (2013.01); *H02K 1/2753* (2013.01); *H02K 2213/03* (2013.01)

(58) Field of Classification Search
CPC .......... H02K 1/02; H02K 1/27; H02K 1/2753; H02K 1/2766; H02K 1/2773; H02K 2213/03
USPC ............ 310/156.01, 156.06, 156.08, 156.57, 310/156.83
See application file for complete search history.

(56) References Cited

U.S. PATENT DOCUMENTS

| | | | | |
|---|---|---|---|---|
| 4,504,755 A * | 3/1985 | Semones | .............. | H02K 1/2773 310/156.23 |
| 4,568,846 A * | 2/1986 | Kapadia | ................. | H02K 21/46 310/156.83 |
| 4,658,165 A * | 4/1987 | Vanderschaeghe | .. | H02K 1/2773 310/156.57 |
| 5,378,953 A * | 1/1995 | Uchida | ................ | H02K 1/2773 310/156.57 |
| 6,121,706 A * | 9/2000 | Nashiki | .................. | H02K 1/246 310/152 |
| 6,211,593 B1 * | 4/2001 | Nashiki | .................. | H02K 1/278 310/114 |
| 6,271,613 B1 * | 8/2001 | Akemakou | .......... | H02K 21/042 310/181 |
| 6,392,324 B1 * | 5/2002 | Kuwahara | ............ | H02K 1/2773 310/156.11 |
| 6,472,789 B1 * | 10/2002 | Akemakou | .......... | H02K 21/042 310/156.49 |
| 6,674,205 B2 * | 1/2004 | Biais | ...................... | H02K 1/274 310/156.53 |
| 6,847,143 B1 * | 1/2005 | Akemakou | .......... | H02K 21/042 310/154.38 |

(Continued)

FOREIGN PATENT DOCUMENTS

JP    2009153352 A  *  7/2009
JP    2013247781 A  *  12/2013  .............. H02K 1/27
JP    2018011456 A  *  1/2018

*Primary Examiner* — Bernard Rojas
*Assistant Examiner* — Rashad H Johnson
(74) *Attorney, Agent, or Firm* — Guice Patents PLLC

(57) ABSTRACT

The present invention provides a permanent magnet motor, in which three holes, including a middle hole and side holes located on two sides of the middle hole, are disposed in a magnetic island of a rotor, the middle hole and the side holes satisfying specific conditions respectively, thereby achieving an optimal cogging reduction efficacy.

10 Claims, 9 Drawing Sheets

(56) References Cited

U.S. PATENT DOCUMENTS

| | | | | |
|---|---|---|---|---|
| 6,849,983 B2* | 2/2005 | Tajima | H02K 1/246 | 310/156.53 |
| 7,772,735 B2* | 8/2010 | Nishiura | H02K 1/2773 | 310/156.36 |
| 7,923,881 B2* | 4/2011 | Ionel | H02K 21/46 | 310/156.53 |
| 7,932,658 B2* | 4/2011 | Ionel | H02K 1/2766 | 310/156.33 |
| 8,350,435 B2* | 1/2013 | Hoemann | H02K 1/2766 | 310/156.48 |
| 8,829,758 B2* | 9/2014 | Takizawa | H02K 1/2773 | 310/156.48 |
| 9,246,364 B2* | 1/2016 | Brahmavar | H02K 21/16 | |
| 9,716,411 B2* | 7/2017 | Tanaka | H02K 1/2766 | |
| 9,893,581 B2* | 2/2018 | Kikuchi | H02K 1/2766 | |
| 2007/0252469 A1* | 11/2007 | Nishiura | H02K 1/2773 | 310/156.56 |
| 2008/0224558 A1* | 9/2008 | Ionel | H02K 1/276 | 310/156.57 |
| 2009/0096308 A1* | 4/2009 | Staudenmann | H02K 1/2773 | 310/156.08 |
| 2011/0291515 A1* | 12/2011 | Li | H02K 1/2766 | 310/156.53 |
| 2012/0181880 A1* | 7/2012 | Zhao | H02K 1/2773 | 310/43 |
| 2013/0015727 A1* | 1/2013 | Iki | H02K 1/246 | 310/49.43 |
| 2013/0207507 A1* | 8/2013 | Han | H02K 15/03 | 310/216.007 |
| 2013/0278105 A1* | 10/2013 | Han | H02K 1/276 | 310/156.38 |
| 2014/0167549 A1* | 6/2014 | Huang | H02K 1/246 | 310/156.07 |
| 2014/0167550 A1* | 6/2014 | Huang | H02K 1/2766 | 310/156.19 |
| 2014/0175932 A1* | 6/2014 | Huang | H02K 1/246 | 310/156.38 |
| 2014/0191607 A1* | 7/2014 | Huang | H02K 1/246 | 310/156.08 |
| 2014/0217849 A1* | 8/2014 | Soma | H02K 1/276 | 310/156.53 |
| 2015/0229171 A1* | 8/2015 | Pan | H02K 1/2773 | 310/156.56 |
| 2015/0256038 A1* | 9/2015 | Nigo | H02K 1/276 | 62/498 |
| 2015/0270752 A1* | 9/2015 | Tanaka | H02K 1/2766 | 310/156.56 |
| 2015/0288233 A1* | 10/2015 | Kim | H02K 1/2766 | 310/156.43 |
| 2015/0303749 A1* | 10/2015 | Okubo | H02K 29/03 | 310/156.38 |
| 2016/0308428 A1* | 10/2016 | Xiao | H02K 29/03 | |
| 2017/0098969 A1* | 4/2017 | Fukumoto | H02K 1/02 | |
| 2017/0155294 A1* | 6/2017 | Chiu | H02K 1/2773 | |
| 2018/0048196 A1* | 2/2018 | Kuo | H02K 1/2766 | |

* cited by examiner

PERMANENT MAGNET MOTOR

BACKGROUND OF THE INVENTION

1. Field of the Invention

The present invention relates to a permanent magnet motor, and more particularly to a permanent magnet motor with lower cogging torque.

2. Description of the Related Art

Cogging of a motor affects performance and also produces vibration and noise, causing restriction and inconvenience in use of the motor. Therefore, the conventional art is all devoted to the research and development of reduction on a cogging torque of a motor, and the prior art intending to reduce cogging by technical means such as a shape, a size, a pole pitch and a magnetization mode of a magnet, an opening angle of magnets, a depth of a boot, a combination of the number of slots/poles, and an auxiliary slot is disclosed.

Specifically, the prior art shown in FIG. 1 discloses a built-in construction that achieves the efficacy of reducing cogging by changing an opening angle of a pair of magnets (2) of a rotor (1), in which the pair of magnets (2) is buried in a V shape in the rotor (1). Furthermore, as shown in FIG. 2, a construction of a hole (4) is further disposed in a magnetic island (3) of each pole, so that the magnetic field lines is restricted by the hole (4) and thus the magnetic field lines are more concentrated to have more efficient linkage with a stator winding, thereby achieving the efficacy of reducing a cogging torque.

Although such conventional art discloses hole constructions to change flux distribution of a rotor core, the prior art lacks optimized detailed technical content such as the shape, the number, the size and the position of the holes for the efficacy of reducing the cogging torque. The deficiency of the prior art needs to be overcome.

SUMMARY OF THE INVENTION

Accordingly, the main objective of the present invention is to provide a permanent magnet motor, in which holes disposed in a magnetic island of a rotor of a motor are optimized in configuration of the shape, the diameter and the spatial form, thereby reducing a cogging torque, a total harmonic distortion of a counter electromotive force, and a torque ripple, and further improving control precision and reducing vibration and noise.

In order to achieve the above objective, in the permanent magnet motor provided in the present invention, three holes are disposed in each magnetic island and comprise a middle hole and two side holes located on two sides of the middle hole, and the middle hole and the side holes respectively satisfy the following conditions, thereby achieving the optimal cogging reduction efficacy:

$10° \leq \theta \leq (360°/P) - 27°;$ $0.5\ g \leq r \leq 3\ g;$ $0.5\ g \leq R \leq 3\ g;$ $S(\tfrac{2}{3}) \leq d \leq S - (r+1);$ and $S(\tfrac{2}{3}) \leq D \leq S - (R+1),$ wherein:

$\theta$ is an angle between the side holes with a center of curvature of the rotor being an origin.

P is the number of poles of the rotor of the motor.

r is a radius of each side hole.

R is a radius of the middle hole.

g is a width of an air gap between the rotor and a stator of the motor.

S is a radius of the rotor.

d is a depth between a center of curvature of each side hole and the center of curvature of the rotor.

D is a depth between a center of curvature of the middle hole and the center of curvature of the rotor.

The holes are circular holes.

The poles of the motor are formed by a plurality of pairs of magnets respectively disposed in the rotor.

Each pair of magnets is built in a V shape in the rotor.

Further, the number of the holes disposed in the magnetic island of each pole may be increased to four, so that an added bottom hole is located in a V-shaped convergent end of the pair of magnets.

In an embodiment of the present invention, when the number P is 8, a diameter of each side hole is less than a diameter of the middle hole, and a relative position of each hole with respect to the center of curvature of the rotor of the motor and relative positions of the holes with respect to each other are specified, in which a relatively optimal cogging torque reduction efficacy can be obtained when $\theta$ is 12°, r is 0.9 mm, R is 1.3 mm, d is $S(\tfrac{2}{3})$, and D is $S(\tfrac{2}{3})$.

In another embodiment of the present invention, when the number P is 6, a diameter of each side hole is greater than a diameter of the middle hole, in which a relatively optimal cogging torque reduction efficacy can be obtained when $\theta$ is 12°, r is 1.2 mm, R is 0.5 mm, and d and D are both 39 mm.

DETAILED DESCRIPTION OF THE PREFERRED EMBODIMENTS

Descriptions are made step by step with reference to an embodiment of the present invention in combination with drawings.

Figure 3:
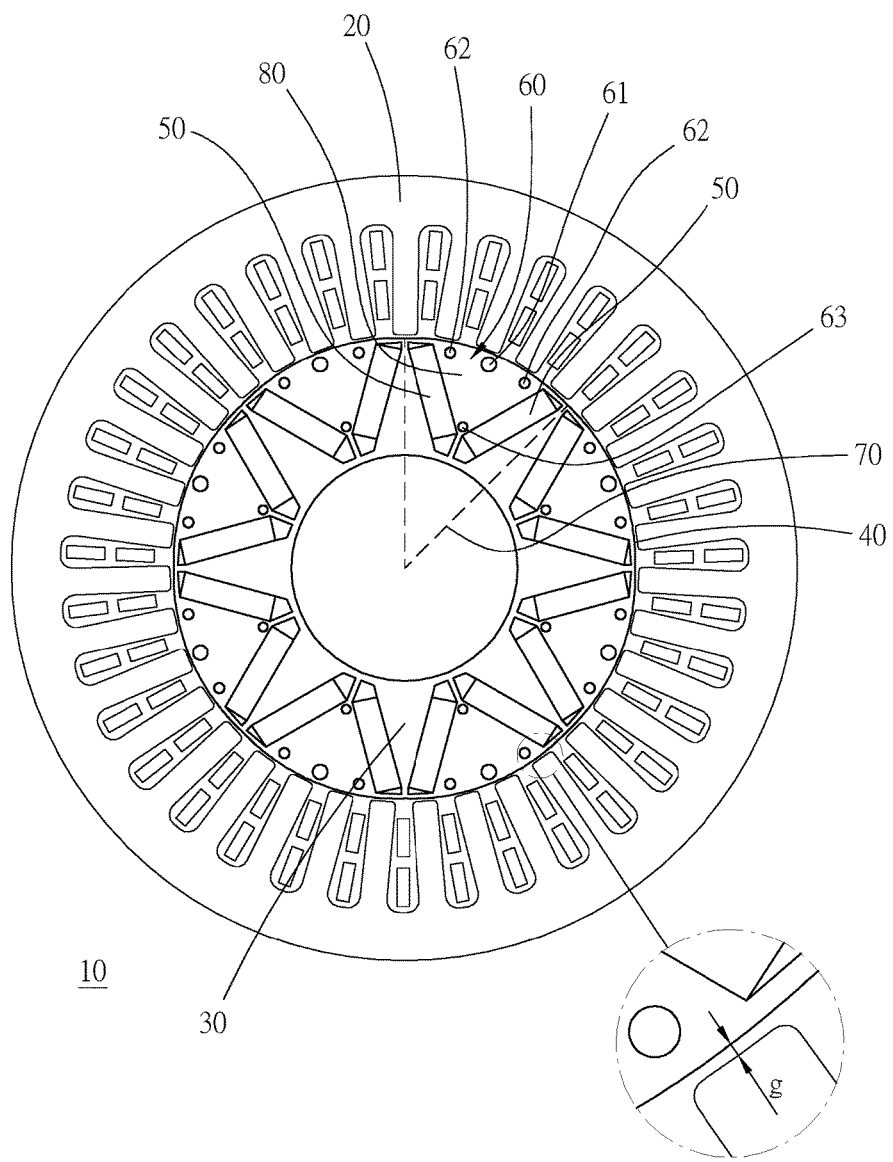
FIG. 3 is a plane view of an embodiment of a permanent magnet motor in the present invention.
Figure 4:
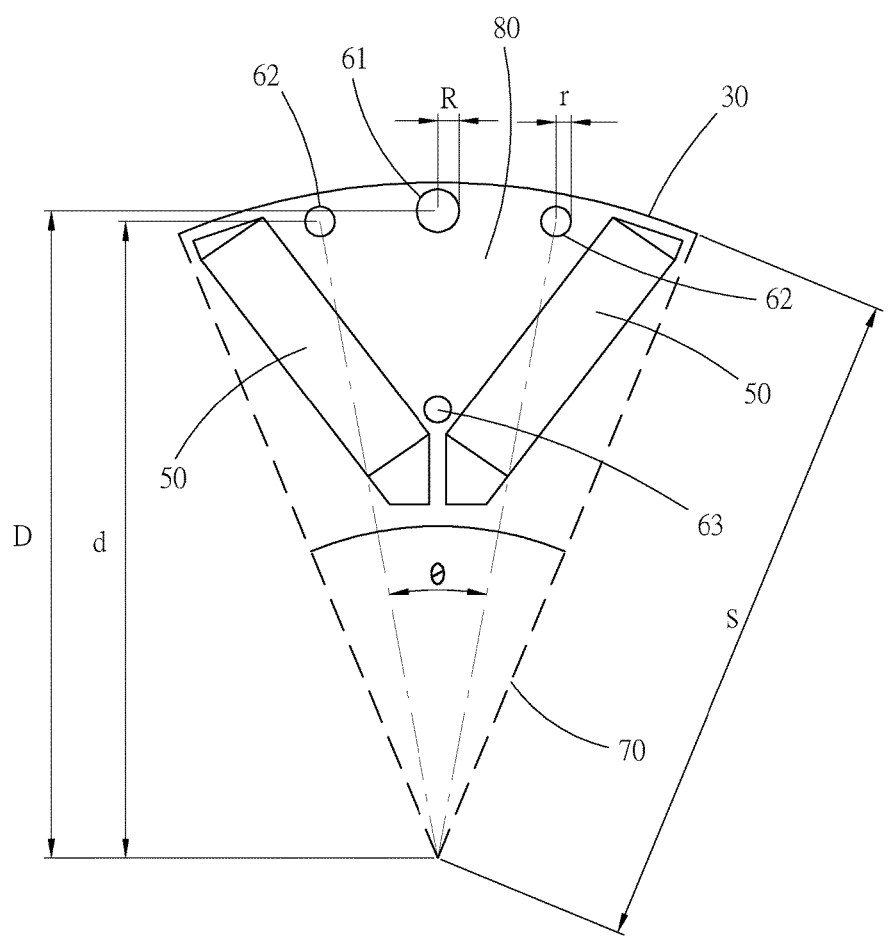
FIG. 4 is a plane view of a single polar region in the embodiment of the permanent magnet motor in the present invention.

First, referring to FIG. 3 and FIG. 4, a permanent magnet motor (10) provided in the embodiment of the present invention mainly includes a stator (20), a rotor (30), an air gap (40), a plurality of magnets (50), and a plurality of holes (60).

The stator (20) is a tubular body having an appropriate wall thickness.

The rotor (30) is cylindrically and coaxially fitted in the stator (20).

The air gap (40) is annular and between an outer peripheral annular surface of the rotor (30) and an inner peripheral annular surface of the stator (20), so that the inner peripheral annular surface of the stator (20) is spaced apart from the outer peripheral annular surface of the rotor (30) without direct contact.

The magnets (50) are pairwise buried in a V shape in the rotor (30) with a V-shaped convergent end facing toward a center of the rotor (30), so that eight polar regions (70) each having an angle of 45 degrees are formed by the pairs of magnets on the peripheral side of the rotor (30) with the center of the rotor (30) being an origin.

The holes (60) are respectively disposed in the magnetic islands (80) in the polar regions (70) and between the peripheral side of the rotor (30) and the corresponding pairs of magnets (50), and a hole axis is parallel to a cylindrical axis of the rotor (30).

Further, the main technical feature of the present embodiment reducing the cogging torque of the motor lies in that the number of the holes (60) disposed in each magnetic island (80) is at least three, wherein the holes (60) comprise a circular middle hole (61) located in the middle of the corresponding polar region (70) and two side holes (62) located on two opposite sides of the middle hole (61); meanwhile, in order to achieve a better cogging reduction efficacy, the number of the holes in each magnetic island (80) may be increased to four in addition to the middle hole (61) and the side holes (62), and an added bottom hole (63) is located in the V-shaped convergent end of the pair of magnets.

In the present embodiment, sizes and spatial states of the middle hole (61) and each side hole (62) should satisfy the following conditions:

$10° \leq \theta \leq (360°/P) - 27°$;

$0.5 \text{ g} \leq r \leq 3 \text{ g}$;

$0.5 \text{ g} \leq R \leq 3 \text{ g}$;

$S(\tfrac{2}{3}) \leq d \leq S - (r+1)$; and $S(\tfrac{2}{3}) \leq D \leq S - (R+1)$.

wherein:

$\theta$ is an angle between the side holes (62) with the center of the rotor (30) being an origin.

P is the number of poles of the rotor (30) and is 8 in the present embodiment.

r is a radius of each side hole (62).

R is a radius of the middle hole (61).

g is a width of the air gap (40).

S is a radius of the rotor (30).

d is a depth between the center of curvature of the side hole (62) and the center of curvature of the rotor (30).

D is a depth between the center of curvature of the middle hole (61) and the center of curvature of the rotor (30).

Figure 5:
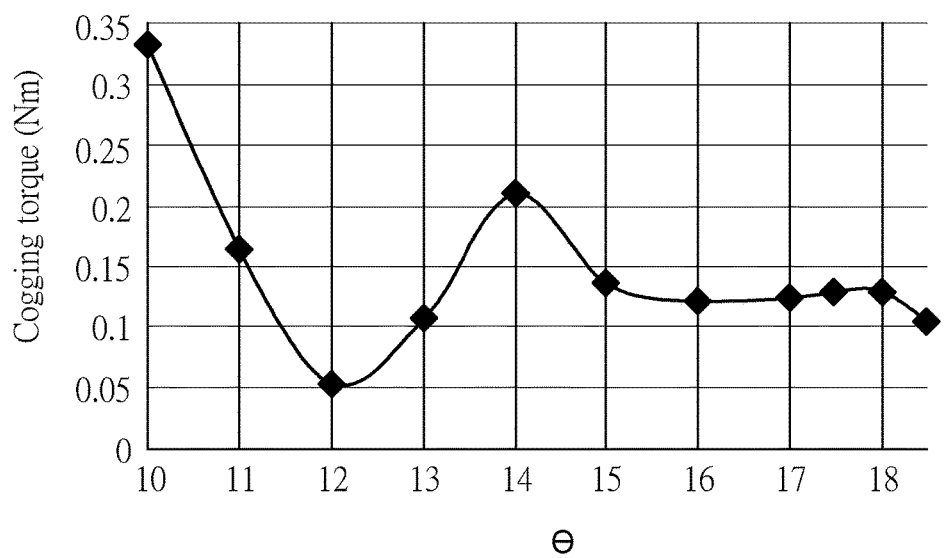
FIG. 5 is a variation relationship diagram between the opening angle and the cogging torque in the embodiment of the permanent magnet motor in the present invention.

Accordingly, in the 8-pole motor construction disclosed in the present embodiment, a relationship between θ and the cogging torque is shown in FIG. 5, wherein the cogging torque is less than 0.1 Nm when the θ is 12°.

Figure 6:
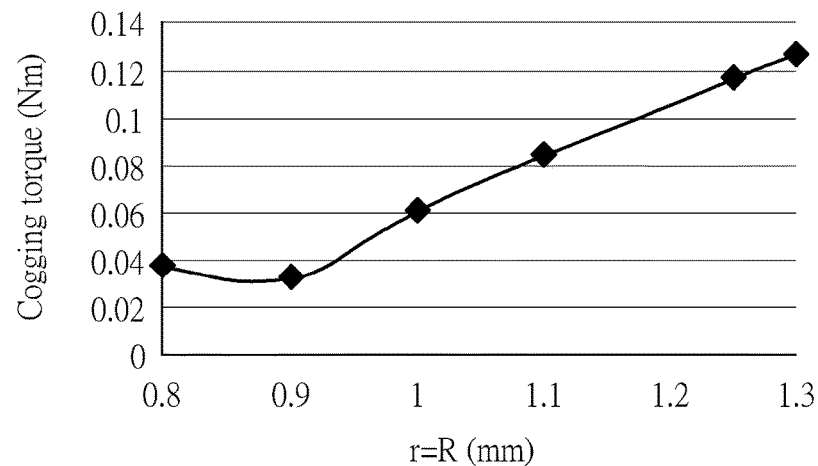
FIG. 6 is a variation relationship diagram between the hole radius and the cogging torque in the embodiment of the permanent magnet motor in the present invention, in which a middle hole and side holes have the same radius.

Further, when θ is set to 12° and the radius of the middle hole (61) is equal to the radius of each side hole (62), a relationship between R and r with the cogging torque is shown in FIG. 6, wherein the cogging torque is further reduced to be less than 0.04 Nm when R=r=0.9 mm.

Figure 7:
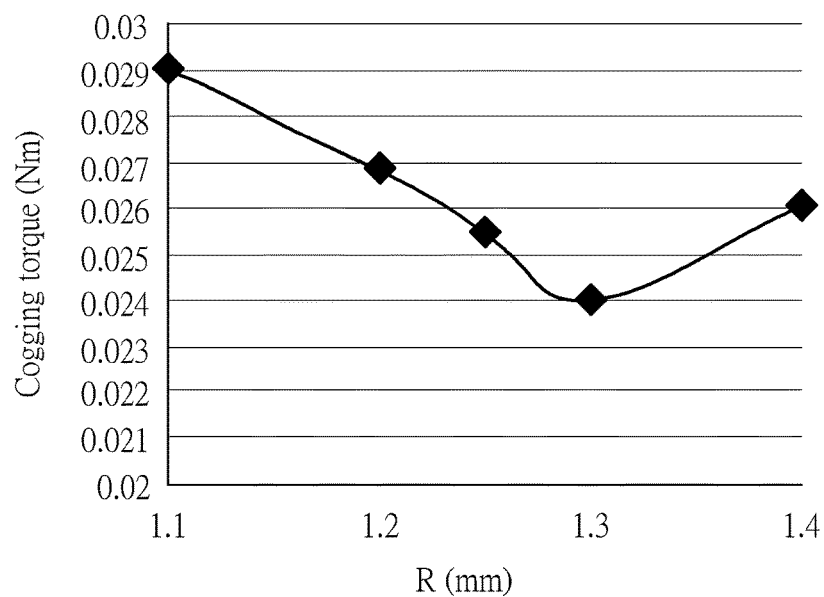
FIG. 7 is a variation relationship diagram of the radius of the middle hole and the cogging torque in the embodiment of the permanent magnet motor in the present invention.

On the foregoing basis, when only R is increased, it can be learned from the relationship diagram shown in FIG. 7 that when R is increased to 1.3 mm, the cogging torque is further reduced to about 0.024 Nm from the state shown in FIG. 6.

It can be known that an optimal cogging torque reduction efficacy is provided when the radius of the middle hole (61) is greater than the radius of each side hole (62) while considering respective sizes of the middle hole (61) and each side hole (62).

Figure 8:
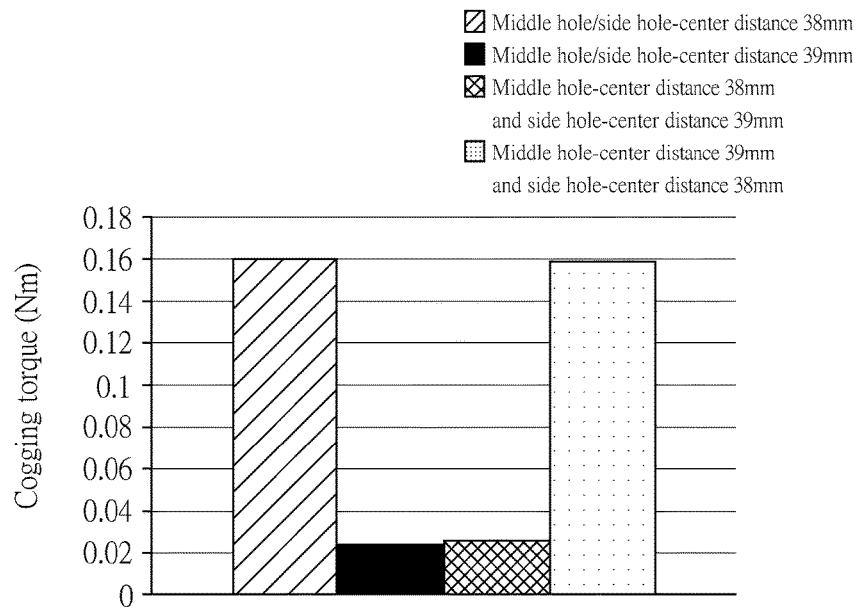
FIG. 8 is a variation relationship diagram of the depth and the cogging torque in the embodiment of the permanent magnet motor in the present invention.

Further, referring to FIG. 8, when relative positions of the middle hole (61) and each side hole (62) are changed, it can also be learned from the relationship diagram of the value of d and the value of D and the cogging torque that the cogging torque is the lowest when d=D=39 mm.

Figure 9:
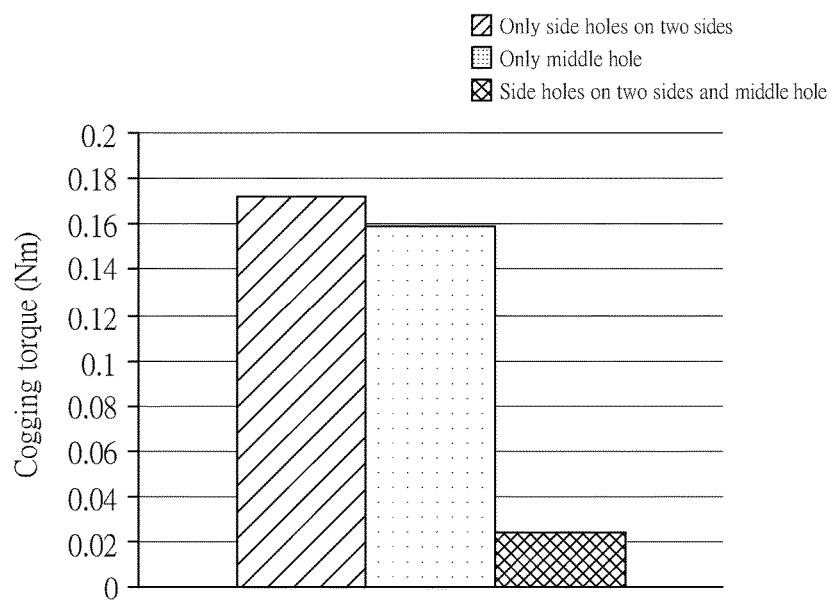
FIG. 9 is a variation relationship diagram of the number of holes and the cogging torque in the embodiment of the permanent magnet motor in the present invention.

FIG. 9 further proves that the cogging torque can be significantly reduced only when the middle hole (61) and the side holes (62) coexist.

It indicates through the data in FIG. 5 to FIG. 9 that in the present embodiment, a relatively optimal cogging torque reduction efficacy is provided when the middle hole (61) and the side holes (62) satisfy P=8, θ=12°, r=0.9 mm, R=1.3 mm, and d=D=39 mm.

The present invention is not limited to the foregoing embodiment of the permanent magnet motor having eight poles; in another embodiment of a permanent magnet motor having six poles, a relatively optimal cogging torque reduction efficacy is provided when P=6, θ=12°, r=1.2 mm, R=0.5 mm, and d=D=39 mm.

Figure 1:
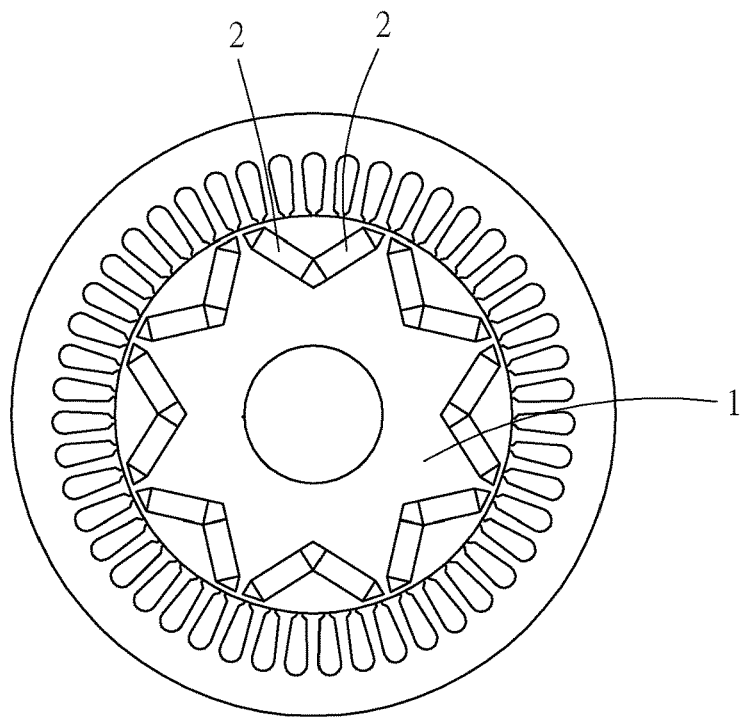
FIG. 1 is a schematic plane view of a conventional permanent magnet motor.
Figure 2:
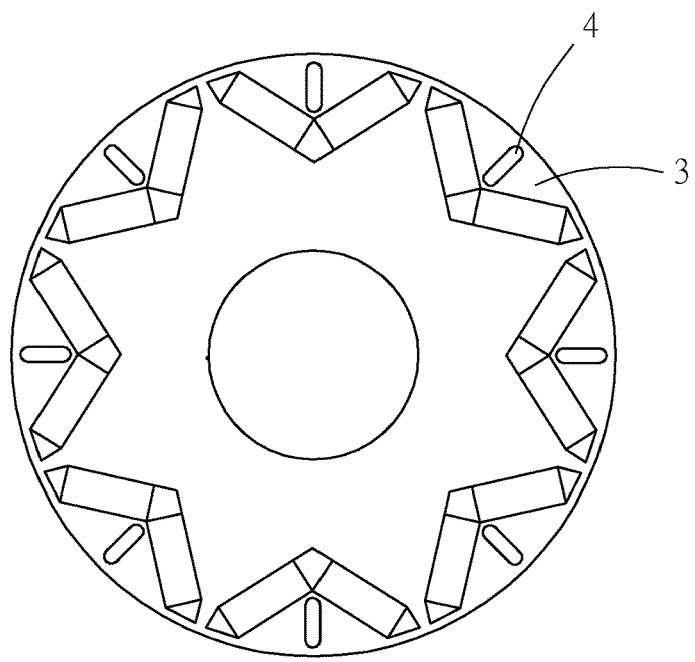
FIG. 2 is a schematic plane view of another conventional permanent magnet motor.
Figure 10:
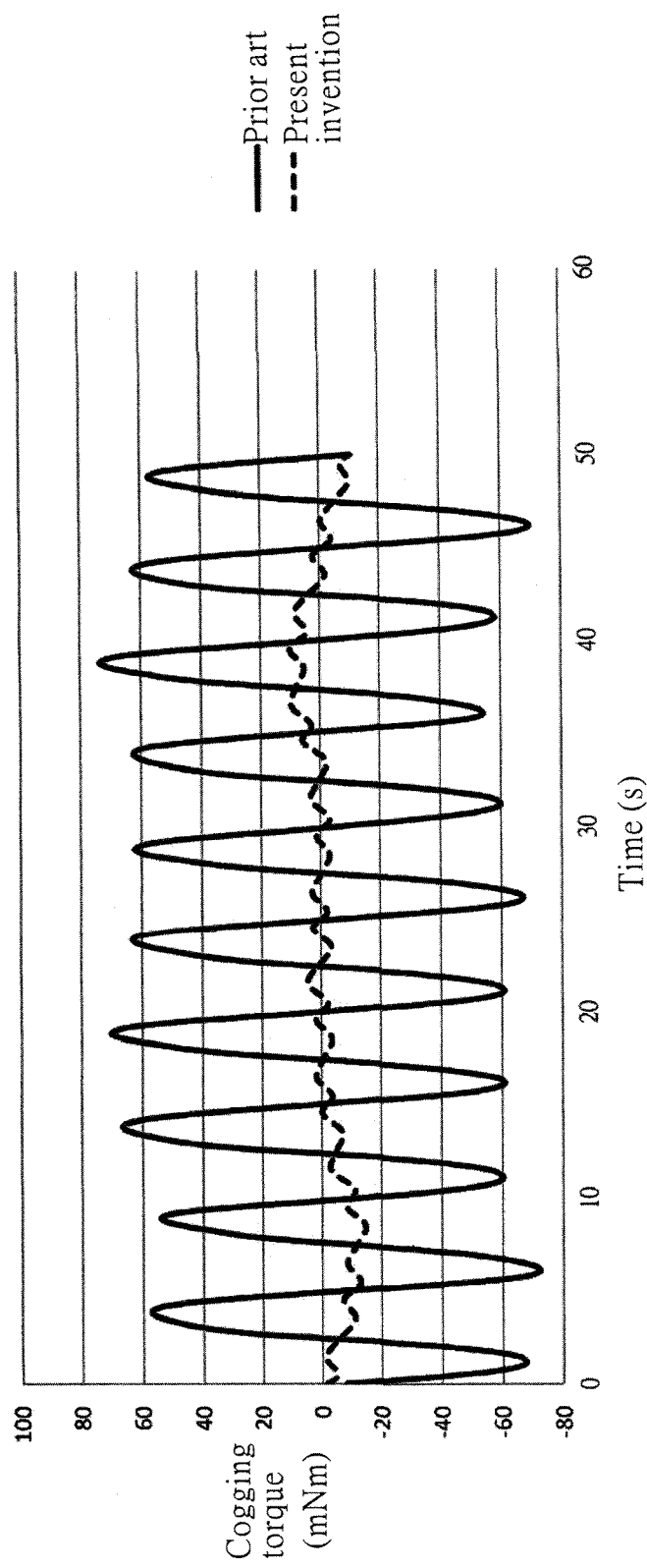
FIG. 10 is a comparison diagram illustrating cogging torques of the embodiment of the permanent magnet motor in the present invention and the permanent magnet motor shown in FIG. 1.
Figure 11:
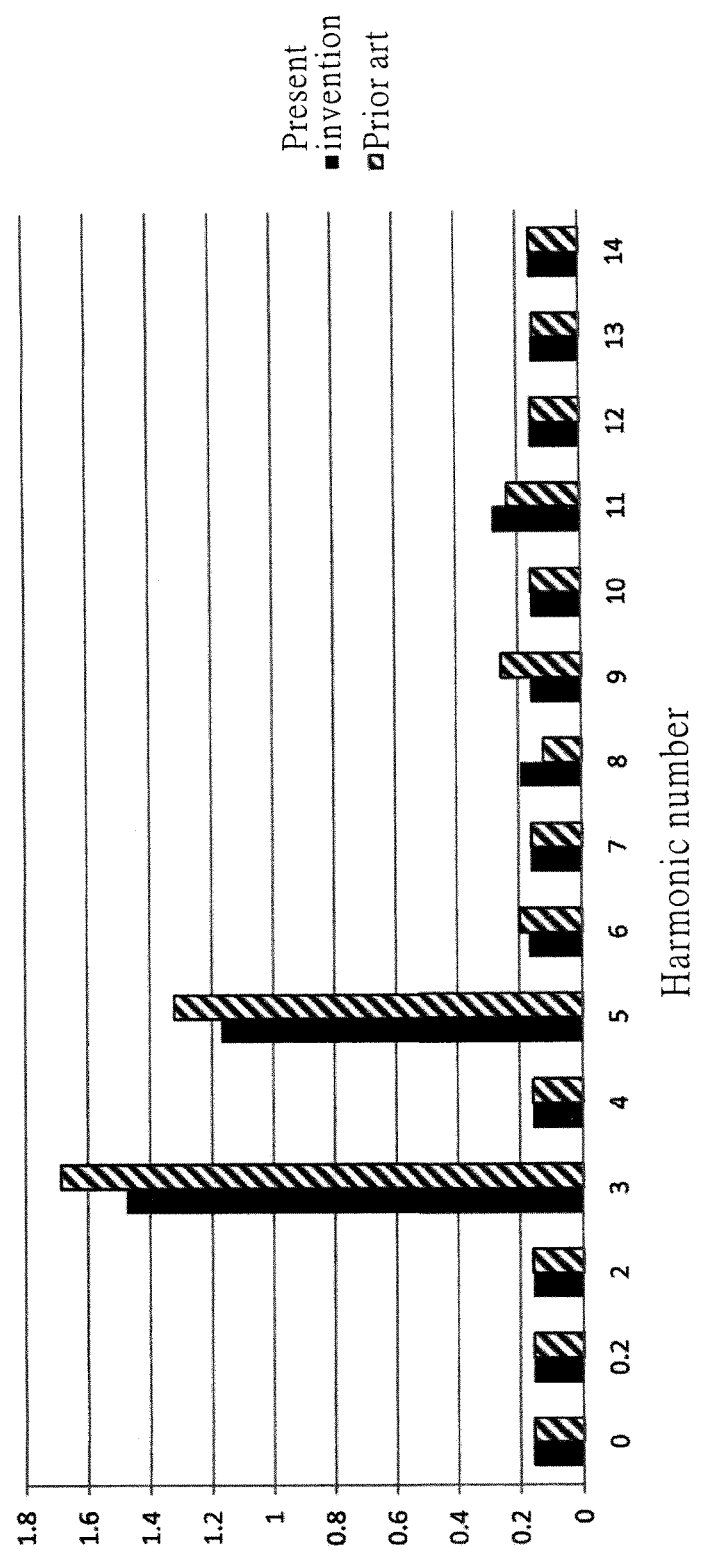
FIG. 11 is a comparison diagram illustrating counter electromotive force harmonics of the embodiment of the permanent magnet motor in the present invention and the permanent magnet motor shown in FIG. 1.
Figure 12:
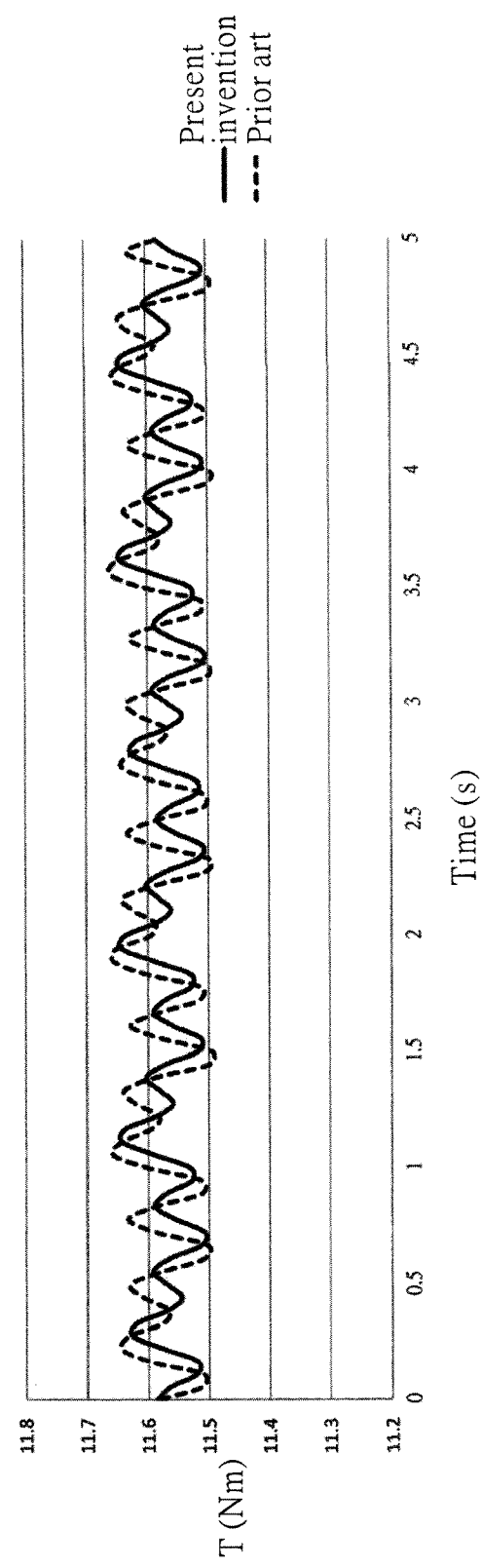
FIG. 12 is a comparison diagram illustrating torque ripples of the embodiment of the permanent magnet motor in the present invention and the permanent magnet motor shown in FIG. 1.

By means of the foregoing technique, the permanent magnet motor (10) provided in the present invention can achieve the efficacy of reducing the cogging torque to a significant extent as shown in the comparison diagram of FIG. 10 compared with the permanent magnet motor shown in FIG. 1, and can also reduce the total harmonic distortion and the torque ripple as shown in FIG. 11 and FIG. 12 so as to improve control precision and reduce noise.

| LIST OF REFERENCE NUMERALS | |
| --- | --- |
| (1) | Rotor |
| (2) | Magnet |
| (3) | Magnetic island |
| (4) | Hole |
| (10) | Permanent magnet motor |
| (20) | Stator |
| (30) | Rotor |
| (40) | Air gap |

-continued

LIST OF REFERENCE NUMERALS

| | |
|---|---|
| (50) | Magnet |
| (60) | Hole |
| (61) | Middle hole |
| (62) | Side hole |
| (63) | Bottom hole |
| (70) | Polar region |
| (80) | Magnetic island |
| θ | angle |
| P | The number of poles R Radius of the middle hole |
| r | Radius of the side hole g Width of the air gap |
| S | Radius of the rotor |
| d | Distance between the side hole and a center of the rotor |
| D | Distance between the middle hole and the center of the rotor |

What is claimed is:

1. A permanent magnet motor, comprising:
a stator, being annular;
a rotor, being circular and coaxially located in the stator;
an air gap, between an outer peripheral annular surface of the rotor and an inner peripheral annular surface of the stator;
a plurality of magnets, disposed in the rotor and comprising a plurality of polar regions having equal angles with a center of curvature of the rotor being an origin; and
a plurality of holes, respectively disposed in magnetic islands of the polar regions and between a peripheral side of the rotor and corresponding magnets, characterized in that:
the number of holes located in each of the magnetic islands is three, and the holes comprise a middle hole and two side holes located on two sides of the middle hole and satisfy the following conditions:

$10° \leq \theta \leq (360°/P) - 27°$;

$0.5\ g \leq r \leq 3\ g$;

$0.5\ g \leq R \leq 3\ g$;

$S(2/3) \leq d \leq S-(r+1)$; and $S(2/3) \leq D \leq S-(R+1)$, wherein:
θ is an angle between the two side holes with a center of curvature of the rotor being an origin;
P is the number of the polar regions;
r is a radius of each of the side holes;
R is a radius of the middle hole;
g is a width of the air gap;
S is a radius of the rotor;
d is a depth between a center of curvature of each of the side holes and the center of curvature of the rotor; and
D is a depth between a center of curvature of the middle hole and the center of curvature of the rotor.

2. The permanent magnet motor according to claim 1, wherein the holes are circular holes.

3. The permanent magnet motor according to claim 1, wherein the magnets in each of the polar regions are pairwise built in a V shape in the rotor with a convergent end facing toward the center of curvature of the rotor.

4. The permanent magnet motor according to claim 3, wherein the holes disposed in each of the magnetic islands further comprise a bottom hole located in the V-shaped convergent end of the pair of magnets.

5. The permanent magnet motor according to claim 1, wherein the number P is 8.

6. The permanent magnet motor according to claim 5, wherein the radius of the middle hole is greater than the radius of each of the side holes.

7. The permanent magnet motor according to claim 5, wherein r is 0.9 mm and R is 1.3 mm.

8. The permanent magnet motor according to claim 1, wherein the number P is 6.

9. The permanent magnet motor according to claim 8, wherein the radius of the middle hole is less than the radius of each of the side holes.

10. The permanent magnet motor according to claim 8, wherein r is 1.2 mm and R is 0.5 mm.

* * * * *